United States Patent
Stenger et al.

[15] 3,655,333
[45] Apr. 11, 1972

[54] PROCESS FOR PRODUCING ANHYDROUS SODIUM CHLORIDE AND PURIFIED SATURATED BRINE

[72] Inventors: Vernon A. Stenger; Walter R. Kramer, both of Midland, Mich.

[73] Assignee: The Dow Chemical Company, Midland, Mich.

[22] Filed: May 4, 1970

[21] Appl. No.: 34,420

[52] U.S. Cl. ................................. 23/89, 23/38, 23/42, 23/66, 23/303
[51] Int. Cl. ................................. C01d 3/06, C01d 3/14
[58] Field of Search ................ 23/89, 42, 40, 39, 38, 303

[56] References Cited

UNITED STATES PATENTS

| | | | |
|---|---|---|---|
| 3,494,746 | 2/1970 | MacKinnon | 23/89 |
| 2,516,988 | 8/1950 | Hengerer | 23/89 |
| 3,396,113 | 8/1968 | Jacoby et al. | 23/89 X |

OTHER PUBLICATIONS

J. W. Mellor's book "A Comp. Treatise on Inorganic and Theoretical Chem.," Vol. 2, 1922 Ed., page 554. Longmans, Green & Co., N.Y.

Primary Examiner—Edward Stern
Attorney—Griswold & Burdick, William R. Norris and Lloyd S. Jowanovitz

[57] ABSTRACT

Solid sodium chloride is incorporated into a sodium chloride-saturated brine containing dissolved matter, other than sodium chloride, to be concentrated. The temperature of the system is reduced to within the range from about 0° C. to about −21° C. to form sodium chloride dihydrate. The dihydrate is separated from the aqueous system thereby increasing the concentration of the other dissolved matter relative to the remaining liquid phase. The process is particularly useful for concentrating dilute systems for further treatment or ultimate disposal.

6 Claims, 1 Drawing Figure

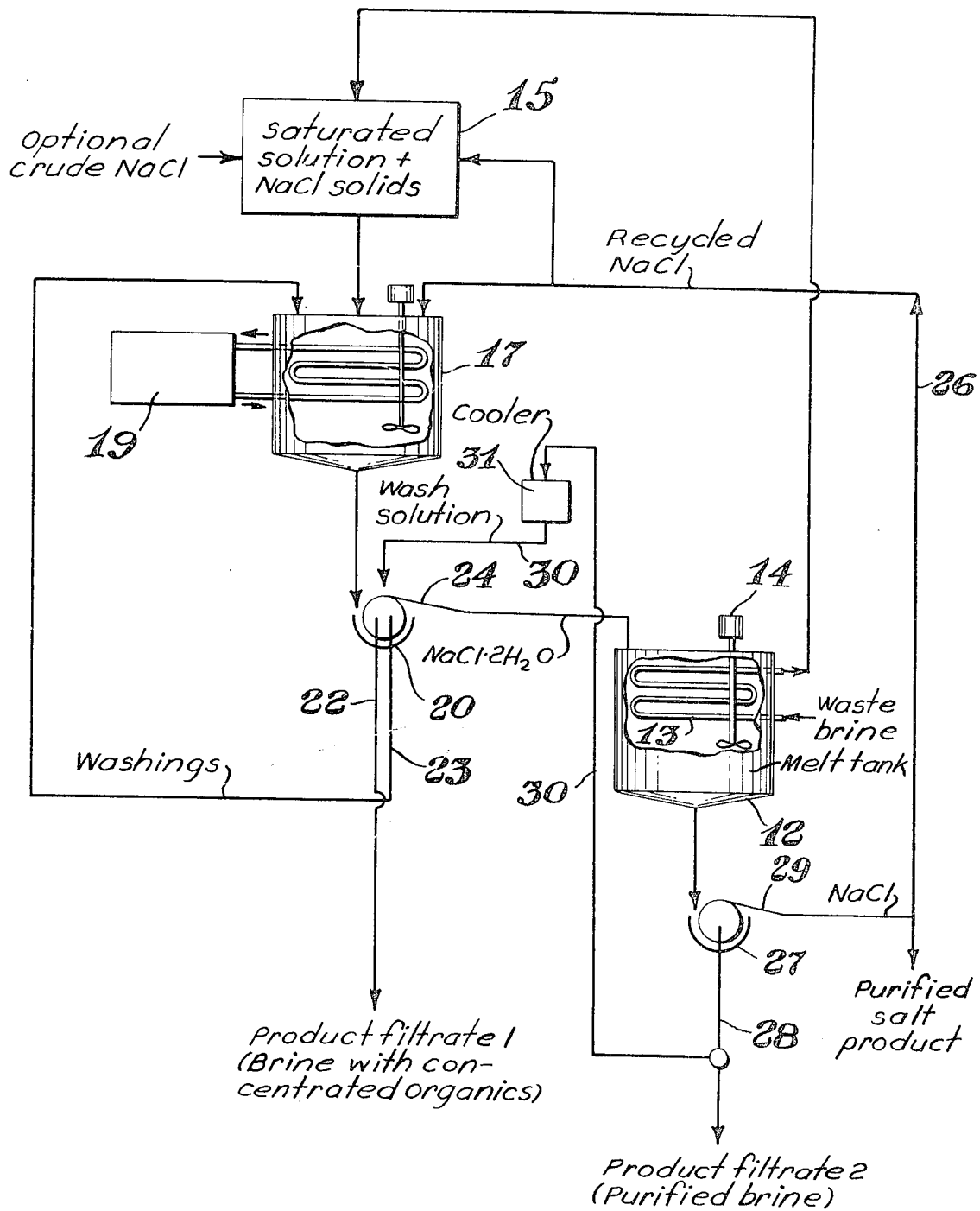

PROCESS FOR PRODUCING ANHYDROUS SODIUM CHLORIDE AND PURIFIED SATURATED BRINE

The instant invention relates generally to the field of concentrating impurities in aqueous systems to render them more amenable to further processing. The invention is generally applicable to sodium chloride containing brines in which a second organic or inorganic component is a principal contaminant.

Illustratively, there are several manufacturing processes which create waste streams that are relatively high in sodium chloride content and also contain smaller amounts of organic impurities. The latter are usually present in sufficient concentrations to interfere with the utilization with the brine. Selective removal of the impurities, although technically feasible, is economically unattractive. Examples of such waste streams are those produced in the manufacture of phenol, glycol and cellulose ethers from organic chlorides.

Waste streams are not, of course, the only systems in which the separation of water to effect a further concentration of brine components is desired. Another example is the further concentration of magnesium chloride in natural brines or in bitterns to facilitate more efficient separation of the magnesium chloride by conventional extraction processes.

It is an object of the instant invention to provide a process for concentrating relatively dilute soluble components in sodium chloride brines.

A particular object is to provide a technique whereby the relatively dilute soluble components may be significantly concentrated by the removal of sodium chloride and water with lower energy requirements than are necessary for evaporation.

Still other objects are to accomplish the foregoing without the application of separatory reagents, such as extraction solvents.

The accompanying schematic drawing depicts one embodiment of the invention wherein an impure brine is resolved into three product streams including a first brine filtrate with an enhanced concentration of dilute soluble impurities, a second filtrate of purified sodium chloride brine, and a solid phase of purified sodium chloride.

SUMMARY OF INVENTION

The foregoing objects, and other benefits as will be apparent hereinafter, are achieved in a process which comprises the following steps: a sodium chloride brine containing dissolved organic or inorganic material in low concentrations relative to the sodium chloride is saturated with sodium chloride. This may be accomplished simply by introducing additional sodium chloride into the brine or by contacting the brine with a bed of solid salt. When brine wells are available, the brine to be saturated may be simply pumped into the salt bearing formation and recovered therefrom as a saturated solution.

Having saturated the brine with sodium chloride, additional solid sodium chloride is introduced into the brine and the entire system is maintained at a temperature within the range from about 0° C. to about −21° C. for a period of time sufficient to permit the formation of sodium chloride dihydrate as a disperse solid phase. During the course of this reaction, sufficient agitation is applied to the system to keep the solid crystals from compacting. Since the formation of the dihydrate is exothermic, cooling will also be required to maintain the temperature within the desired range. The heat of dihydrate formation is about 32 calories per gram.

Once the dihydrate has formed it is removed from the aqueous system by any convenient solid-liquid separatory technique such as filtration, centrifugation or settling. It is preferred that such separation be effected at liquid temperatures within the aforedescribed range conducive to the formation of the dihydrate. Higher temperatures will result in some dihydrate melting and thus loss of separation efficiency. Depending upon the type and quantity of other components of the brine system, lower temperatures may induce the precipitation of impurities with the dihydrate.

The purity of the recovered solid dihydrate crystals is readily improved by washing them with a relatively pure saturated sodium chloride brine. The washing brine is conveniently produced upon melting of the dihydrate crystals. Such melting is readily accomplished by raising the temperature of sodium chloride dihydrate above about 1° C. Above this temperature, the dihydrate reverts to anhydrous sodium chloride solids and a saturated sodium chloride brine. The resulting suspension may then be separated into relatively pure solid sodium chloride and saturated brine by conventional solid-liquid separatory techniques as described above.

In the foregoing manner, there are thus produced three product streams from an incoming impure brine. The first product stream is a saturated brine containing the dilute components in a relatively more concentrated form. The volume of liquid containing these components has been significantly reduced for greater convenience and efficiency in further processing. A second process stream is the purified sodium chloride brine obtained from the melt of the sodium chloride dihydrate. As mentioned above, a portion of this brine may be utilized to wash the filter cake produced upon the first solid-liquid separation. The remaining portion may be utilized in other processes such as a feed for electrolytic chlorine cells. The recovered solid anhydrous and purified sodium chloride may also be recycled. It may be added to the incoming impure brine, either to saturate the brine or as the solid salt incorporated into the saturated brine, as a basis for the formation of the dihydrate. Thus, much of the recovered solid salt may be essentially continuously recycled in the process. Preferably, however, when an impure crude salt source is available, this is employed to saturate the brine and to provide the dihydrate basis thereby allowing a substantially purified, soluble sodium chloride to be recovered from the process.

The operation of the instant invention will be made more apparent by reference to the accompanying drawing. In this embodiment of the invention, an impure sodium chloride brine, such as a waste brine from a chemical manufacturing process for phenol by the hydrolysis of a chloro benzene, containing a dilute organic component which is to be concentrated relative to its brine medium, is passed through the tube side 13 of a first heat exchanger 12 in which heat is exchanged with cold sodium chloride dihydrate solids obtained elsewhere in the process. As the solids melt, they form a slurry which is suspended in the tank by means of a mixer 14. Heat for melting the dihydrate is supplied by the incoming waste brine thereby cooling it. Subsequently the impure brine passes into a holding tank 15 to which sodium chloride is added in an amount sufficient to saturate the solution. An additional amount of solid sodium chloride sufficient to provide from about 30 to about 60 weight per cent NaCl solids is then incorporated into the saturated brine. The resulting mixture is passed into a second heat exchanger 17 wherein its temperature is reduced to within the range from about 0° C. to about −21° C., preferably from about −5° C. to about −15° C. The tube side 16 of the second heat exchanger 17 is cooled by means of auxiliary refrigerating equipment 19. The holding time in the second heat exchanger 17 is sufficient to induce the formation of sodium chloride dihydrate. Usually, a residence time of at least about 10 minutes produces effective, if not complete, conversion to the dihydrate. Periods up to 1 hour or more will assure essentially complete transformation of any sodium chloride present to the dihydrate form. Longer residence times may be required for complete conversion if the solid salt incorporated into the brine has been rigorously dried prior to its use in the process.

Intermittently, or continuously, as the reaction proceeds, the contents of the second heat exchanger 17 are introduced onto a first rotary vacuum filter 20, which is equipped with filtrate and wash water recovery lines 22 and 23 respectively. The filtrate from this filter, hereinafter designated Product filtrate 1, is a saturated sodium chloride brine in which the soluble organic components have been concentrated relative to their brine medium. The solid filter cake 24, consisting essentially of sodium chloride dihydrate, is washed, as desired, and the wash water is recycled through wash recovery line 23 to the second heat exchanger 17. The purified sodium chloride dihydrate, recovered as a solid filter cake 24, is passed to the first heat exchanger 12 wherein it is melted to yield a mixture of anhydrous sodium chloride precipitate and a purified sodium chloride brine. This slurry is resolved into its solid and liquid components by a second filtration on a rotary filter 27 with brine filtrate line 28 and a filter cake 29 of anhydrous sodium chloride. The sodium chloride filter cake 29 may then be recycled to either the holding tank 15, as make-up salt, or to the dihydrate forming second heat exchanger 17. It may also be recovered as a product for later granulation and packaging for commercial purposes. Under steady state, continuous operations, there will usually be more than sufficient salt for use in saturating the waste brine to allow for recovery of some purified salt as a by-product. The amount of the latter is also influenced by the amount of crude NaCl that is used to saturate the brine.

Product filtrate 2, from the second filtration, is a highly satisfactory purified brine feed for an electrolytic chlorine cell. A portion of this brine may also be recycled through line 30 as the washing medium used on filter 20. This portion of the brine is cooled, as necessary, by means of refrigeration unit 31 to maintain its temperature below the melting point of the dihydrate. Product filtrate 1 may be further processed to recover the concentrated organics, or in the event further concentration is desired, subjected to a second concentration by repeating the described process.

For each separation in accordance with the instant invention, the volume ratio of Product filtrate 1 to volume of waste brine input will vary according to the amount of solid NaCl incorporated into the saturated brine. Ratios as large as 0.40 are readily achieved and ratios as high as 0.60 are possible. The only essential limit is the amount of liquid phase that must be maintained in the presence of the dihydrate to provide a readily separable liquid-solid system.

The reduced volume of impure sodium chloride brine, Product filtrate 1, is more conveniently handled in conventional waste treatment processes and, when the components thereof are of sufficient value and in adequate concentrations, the brines may be subjected to separatory treatment on activated charcoal or other specific absorbing media for the soluble impurities, to effect a further separation and purification of the impure brine.

The invention will be more fully understood by reference to the following examples.

EXAMPLE 1

A waste brine resulting from the manufacture of phenol by the caustic hydrolysis of monochlorobenzene was subjected to concentration in accordance with the present invention to reduce the total volume of liquid waste for ultimate disposal, as by injection into a subterranean formation, or for final purification by extraction of the concentrated impurities. For instance, by reducing the volume of waste liquid, the equipment requirements for extraction of the organic phase are substantially reduced.

In particular, a sample of a waste brine was analyzed and found to have a density of 1.142 grams per milliliter at 26° C. and to contain 20 weight per cent sodium chloride. The organic carbon content of the brine was 1.165 grams per liter or 0.102 per cent by weight. To bring the brine up to a fully saturated solution of sodium chloride, 80 grams of a commercial sodium chloride were added to 800 milliliters of the brine. The resulting brine contained 26.4 per cent sodium chloride, 0.093 per cent organic carbon and had a density of 1.194.

A 100-milliliter aliquot of the saturated brine was treated with 43.9 grams of air-dried dried sodium chloride. The resulting mixture was cooled to about −b° C. with sufficient agitation to suspend the dihydrate as it formed. The dihydrate formation is exothermic (32 calories per gram). Thereafter and at a temperature less than about 1° C., the suspension of sodium chloride dihydrate was filtered on a vacuum filter. The vacuum was maintained until the filter cake was fairly free from adhering liquor, but washing with a saturated sodium chloride brine was omitted.

The filter cake (NaCl · 2H$_2$O) was allowed to warm to about 15° C., whereupon a precipitate of essentially anhydrous sodium chloride was formed in a saturated brine. The system was then filtered to remove the precipitated anhydrous sodium chloride as an essentially pure product. The filtrate, as was the filtrate first obtained above, was subjected to an analysis for its sodium chloride and organic carbon contents. The results are reported in the following table.

TABLE I

Distribution of Salt and Organic Carbon

| Fraction | Filtrate I | Filtrate II | Recovered Recovered solid NaCl |
|---|---|---|---|
| Filtration temp., °C | −10 | +15 | |
| Weight of fraction, g. | 67.0 | 40.7 | 47.3 |
| NaCl content, g. | 16.8 | 10.7 | 47. |
| organic carbon content, mg. | 72.4 | 13.3 | 2. |
| Percent carbon on contained salt | 0.43 | 0.124 | 0.0043 |
| Percent carbon on brine | 0.11 | 0.033 | |

* Solids from second filtration, after air-drying.

The above data indicate that about 100 milliliters of the waste brine was reduced to approximately 56 milliliters (67/1.194) into which approximately 85 per cent of the originally available organic impurities had been concentrated. It is to be noted that the data reflect loss of some organic carbon and about 12 grams of water as result of evaporation taking place during the vacuum filtration.

In a manner similar to the foregoing, the first filtrate obtained above containing the major amount of organic dispersed phase can be subjected to further treatment with solid salt to further reduce the aqueous phase. The concentrating, in fact, may proceed to the point at which the on-set of precipitation in the residual phase results in the production of an impure sodium chloride dihydrate.

Ultimate disposition of the first filtrate containing the organic phase can be according to conventional waste separatory techniques. For example, the organics are readily separated on activated carbon. The remaining aqueous brine may be recycled to the process or subjected to other waste disposal treatments, such as injection in waste disposal wells.

The recovered, purified sodium chloride, of course, has direct commercial potential. Alternatively, the solid sodium chloride can be recycled to the process as required to make up concentrated brine solutions and to provide the sodium chloride in excess of solubility limits as the basis for dihydrate formation.

In a further embodiment of the instant invention, the concentrating technique is applied to a bittern brine to achieve partial separation of the sodium chloride and magnesium chloride values. The process is conducted in a manner similar to that described above.

In the event the crude NaCl brine to be treated in accordance with the instant invention contains calcium and sulfate impurities, it may be desirable to pretreat the brine with sodium carbonate to first precipitate the calcium as calcium carbonate. After removal of the latter by any convenient solid-liquid separatory technique such as filtration, centrifugation or settling, the brine thus treated may be further processed in accordance with the instant invention. The sulfate is concentrated simultaneously with the organic impurities.

What is claimed is:

1. A process which comprises incorporating solid sodium chloride into a sodium chloride saturated brine containing dissolved organic or inorganic contaminants to be concentrated relative to the aqueous phase, maintaining the suspension of solid sodium chloride at a temperature within the range from about 0° C. to about −21° C., while simultaneously agitating the suspension forcefully enough to prevent the solid crystals from compacting, for a period of time sufficient to form sodium chloride dihydrate, separating the sodium chloride dihydrate from the brine system as a solid thereby effecting the desired relative concentration of the dissolved organic or inorganic contaminants in the brine, decomposing the sodium chloride dihydrate to provide anhydrous solid sodium chloride and purified saturated brine, separating the solid sodium chloride from the brine and recycling some portion thereof to the first step of the process whereby solid sodium chloride is incorporated into the crude brine.

2. A method as in claim 1 wherein the process steps are applied a second time to the aqueous phase separated from the sodium chloride dihydrate.

3. A method as in claim 1 wherein the saturated brine is prepared from a waste stream containing, in addition to the dissolved organic or inorganic contaminants to be concentrated, less than a saturating amount of NaCl and sufficient additional NaCl is first added to the brine to saturate it with NaCl.

4. A method as in claim 1 wherein decomposition of the dihydrate is achieved by heat exchanging it with incoming crude brine.

5. A method as in claim 1 wherein the solid sodium chloride incorporated into the brine is a crude salt.

6. A method as in claim 1 wherein the suspension of solid salt in brine is controlled to a temperature within the range from bout −5° to about −15° C.

* * * * *

PO-1050
(5/69)

UNITED STATES PATENT OFFICE
CERTIFICATE OF CORRECTION

Patent No.  3,655,333               Dated  11 April 1972

Inventor(s)     Vernon A. Stenger and Walter R. Kramer

It is certified that error appears in the above-identified patent and that said Letters Patent are hereby corrected as shown below:

Column 3, line 73, delete "-b°C." and insert -- -10°C.--.

Column 4, Table 1, delete the first "Recovered" in the heading of the last column.

Column 4, Table 1, add -- * -- after "NaCl" in the heading of the last column.

Column 6, line 19, change "bout" to --about--.

Signed and sealed this 25th day of July 1972.

(SEAL)
Attest:

EDWARD M. FLETCHER, JR.        ROBERT GOTTSCHALK
Attesting Officer              Commissioner of Patents